United States Patent
Weigand et al.

(10) Patent No.: US 7,228,941 B2
(45) Date of Patent: Jun. 12, 2007

(54) METERING DEVICE FOR LUBRICANT

(75) Inventors: Michael Weigand, Elfershausen (DE); Bernd Scheit, Bad Bocklet (DE); Stefan Brand, Bad Kissingen (DE); Thomas Hildenbrand, Bad Brückenau (DE)

(73) Assignee: perma-tec GmbH & Co. KG, Euerdorf (DE)

( * ) Notice: Subject to any disclaimer, the term of this patent is extended or adjusted under 35 U.S.C. 154(b) by 643 days.

(21) Appl. No.: 10/476,045

(22) PCT Filed: Aug. 10, 2002

(86) PCT No.: PCT/EP02/08977

§ 371 (c)(1),
(2), (4) Date: Oct. 28, 2003

(87) PCT Pub. No.: WO04/001279

PCT Pub. Date: Dec. 31, 2003

(65) Prior Publication Data

US 2004/0155068 A1    Aug. 12, 2004

(30) Foreign Application Priority Data

Jun. 19, 2002 (DE) ................................ 102 27 496

(51) Int. Cl.
*F16N 27/00* (2006.01)
(52) U.S. Cl. ...................................................... 184/7.4
(58) Field of Classification Search ............... 184/7.4, 184/8, 9, 26, 27.1, 38.4; 222/284, 285, 288, 222/309, 333
See application file for complete search history.

(56) References Cited

U.S. PATENT DOCUMENTS 2,899,017 A * 8/1959 Liljemark .................. 184/27.1

(Continued)

FOREIGN PATENT DOCUMENTS

AT            199746095 B2    6/1998

(Continued)

OTHER PUBLICATIONS

International Search Report.

*Primary Examiner*—Vicky A. Johnson
(74) *Attorney, Agent, or Firm*—Collard & Roe, P.C.

(57) ABSTRACT

The invention relates to a metering device for lubricant having a lubricant reservoir (1), a piston (3), which is arranged on a threaded spindle (2), within the lubricant reservoir and a drive head 4, which has a drive shaft (7) connected to the threaded spindle (2) and an electromechanical drive (5) for actuating the drive shaft. The drive shaft (7) contains a lubricant passage duct (8) which opens into the lubricant storage space of the lubricant reservoir. A ram (9) is inserted into the lubricant passage duct (8) of the drive shaft, said ram having an axial bore (10) with a nonreturn valve (11) on the inlet side, and also a ram head (13) which is arranged in a rotationally fixed manner and is loaded by a compression spring (12). The ram head (13) bears under the effect of the compression spring (12) against a control surface (14) of the drive shaft (7). The control surface (14) and the associated contact surface of the ram head (13) are designed as slotted-guide surfaces which, when the control surface (14) rotates, bring about stroke movements of the ram (9), said movements conveying lubricant through the bore (10) in the ram (9) to a lubricant outlet at the end of the ram.

19 Claims, 9 Drawing Sheets

U.S. PATENT DOCUMENTS

| | | | |
|---|---|---|---|
| 3,568,736 A * | 3/1971 | Linch et al. | 141/349 |
| 3,595,340 A * | 7/1971 | Obergefell et al. | 184/28 |
| 4,236,881 A * | 12/1980 | Pfleger | 417/502 |
| 4,632,648 A * | 12/1986 | Goyne | 417/502 |
| 4,711,321 A * | 12/1987 | Hedlund | 184/7.4 |
| 4,793,524 A * | 12/1988 | Starr | 222/309 |
| 5,022,556 A * | 6/1991 | Dency et al. | 222/1 |
| 5,271,528 A * | 12/1993 | Chien | 222/63 |
| 5,509,501 A * | 4/1996 | Damme | 184/7.4 |
| 5,709,284 A * | 1/1998 | Shultz, Sr. | 184/5.1 |
| 5,732,794 A * | 3/1998 | Orlitzky | 184/61 |
| 5,971,229 A * | 10/1999 | May et al. | 222/390 |
| 6,062,248 A * | 5/2000 | Boelkins | 137/118.02 |
| 6,216,822 B1 * | 4/2001 | May et al. | 184/105.1 |
| 6,354,816 B1 * | 3/2002 | Yang | 417/411 |
| 6,357,922 B1 * | 3/2002 | Harbottle et al. | 384/466 |
| 6,408,985 B1 * | 6/2002 | Orlitzky et al. | 184/37 |
| 6,561,316 B1 * | 5/2003 | Graf et al. | 184/38.4 |
| 6,601,738 B2 | 8/2003 | Weigand et al. | |
| 6,619,429 B1 * | 9/2003 | Brand | 184/3.1 |
| 6,675,992 B2 * | 1/2004 | Schumann | 222/390 |
| 6,802,394 B2 * | 10/2004 | Patterson et al. | 184/45.1 |

FOREIGN PATENT DOCUMENTS

| | | |
|---|---|---|
| DE | 9214096 | 12/1992 |
| DE | 10119688 | 11/2002 |
| EP | 0845631 | 6/1998 |
| EP | 1213529 | 6/2002 |

* cited by examiner

METERING DEVICE FOR LUBRICANT

CROSS REFERENCE TO RELATED APPLICATIONS

Applicants claim priority under 35 U.S.C. §119 of GERMAN Application No. 102 27 496.7 filed on Jun. 19, 2002. Applicants also claim priority under 35 U.S.C. §365 of PCT/EP02/08977 filed on Aug. 10, 2002. The international application under PCT article 21(2) was not published in English.

BACKGROUND OF THE INVENTION

1. Field of the Invention

The invention relates to a metering device for lubricant having a lubricant reservoir, a piston, which is arranged on a threaded spindle, within the lubricant reservoir and a drive head, which has a drive shaft connected to the threaded spindle and an electromechanical drive for actuating the drive shaft.

2. The Prior Art

In an embodiment known from EP-A 0 845 631, the electromechanical drive has a threaded spindle which is driven by a geared motor. The lubricant reservoir is provided with an outlet opening for lubricant which is ejected by a movement of the piston. The build-up of pressure which can be achieved in the lubricant reservoir is limited. If a large flow resistance builds up at the outlet opening or in an adjoining line, a device protecting against overload responds, switching off the electromechanical drive. The supply of the lubricating points with lubricating products is not always ensured. Furthermore, in the known embodiment, the changing of the lubricant reservoir is complicated. Line systems arranged downstream have to be detached from the lubricant reservoir. If the electromechanical drive is supplied externally with power and/or the lubricant dispenser is connected to a central controller, electric plug-in connections have to be pulled off from the housing before the housing containing the electromechanical drive can be unscrewed from the lubricant reservoir.

Furthermore, lubricant dispensers comprising a piston pump arranged in a housing and a lubricant reservoir connected detachably to the housing are known in practice. A duct which is fixed on the housing is connected to the intake side of the piston pump and opens into the lubricant reservoir. The housing, in which the piston pump, a control device and, if appropriate, batteries for supplying the piston pump with power are arranged, has an outlet duct which is connected to the delivery side of the piston pump. The lubricant reservoir contains a spring-loading piston or expansion bellows which puts the lubricant store under pressure and supplies the generally very viscous lubricating product, for example lubricating grease, to the intake side of the piston pump. The constant pressurization of the lubricating-product store gives rise to the risk of the lubricant bleeding out, i.e. the pressurization by the piston causes small quantities of oil to be continuously ejected out of the grease and thereby causes the lubricating grease to solidify. The piston pump furthermore constitutes a relatively complicated and expensive assembly.

SUMMARY OF THE INVENTION

The invention is based on the object of specifying an electromechanically operated lubricant dispenser which is of simple construction and permits an exactly metered discharge of lubricant at high ejection pressure. The intention is for the lubricant store not to be acted upon by a compression-spring-loaded piston so as to avoid the risk of lubricant bleeding out.

Starting from a metering device of the construction described at the beginning, the object is achieved according to the invention by the drive shaft containing a lubricant passage duct which opens into the lubricant storage space of the lubricant reservoir, by a ram being inserted into the lubricant passage duct of the drive shaft, said ram having an axial bore with a nonreturn valve on the inlet side, and a ram head which is arranged in a rotationally fixed manner and is loaded by a compression spring, and by the ram head bearing under the effect of the compression spring against a control surface of the drive shaft, the control surface and the associated contact surface of the ram head being designed as slotted-guide surfaces which, when the control surface rotates, bring about stroke movements of the ram, said movements conveying the lubricant through the bore in the ram to a lubricant outlet at the end of the ram.

After rotation of the drive shaft and of the threaded spindle connected to the drive shaft, the piston arranged in the lubricant reservoir executes an adjusting movement in accordance with the thread pitch of the threaded spindle, with lubricant being displaced out of the lubricant reservoir and being supplied to the lubricant passage duct of the drive shaft. At the same time, when the drive shaft rotates, the ram executes stroke movements which are controlled by the slotted-guide surfaces. In the case of an inwardly directed movement of the ram, the nonreturn valve opens and lubricant passes into the axial bore in the ram. In the case of a following, outwardly directed movement of the ram, the nonreturn valve closes and a quantity of lubricating product defined by the stroke of the ram is ejected out of the axial bore in the ram. In the device according to the invention, the adjusting movements of the piston in the reservoir and the movements of the ram are kinematically coupled. The movement of the piston inevitably causes the lubricant duct to be filled. The discharge of lubricant then takes place by movement of the ram, with it being possible to achieve a high ejection pressure. The slotted-guide surfaces, which determine the movements of the ram, and the thread pitch of the threaded spindle, which defines the adjusting movements of the piston arranged in the reservoir, are matched to each other in a suitable manner. The slotted-guide surfaces of the control surface and of the associated contact surface of the ram head are of complementary design and have wedge-shaped sliding surfaces and steps adjoining them.

There are numerous possibilities for the further structural refinement of the device according to the invention. It lies within the scope of the invention for a gearwheel which is supported axially in the drive head to be connected to or integrally formed on the end of the drive shaft, the gearwheel being in engagement with a pinion of the electric motor and having the control surface for the movements of the ram. Furthermore, according to a preferred refinement, an overload coupling which is formed firstly from a coupling disk integrally formed on the drive shaft and secondly by a gearwheel driving the drive shaft is provided, the gearwheel also having the control surface which interacts with the ram head. The overload coupling is provided at the point of the shaft train at which the greatest torque may occur. It responds when the torque exceeds a limit value, and protects the device against irreversible damage. The occurrence of a torque triggering the overload coupling may have different causes. The driving torque increases when the lubricant solidifies, for example at low temperatures, the lubricant outlet has become clogged or the piston strikes against a housing surface after complete emptying of the lubricant reservoir.

A particularly preferred structural embodiment makes provision for the gearwheel to have a gear ring which annularly surrounds a receiving space for the coupling disk integrally formed on the ram. The gearwheel is placed onto the coupling disk and is guided rotatably on the circumference of the coupling disk. The base of the receiving space has a coupling profile of bumps or depressions, which is in engagement with mating surfaces on the coupling disk. This embodiment operates in the manner of an axial toothed coupling, with the coupling profile preferably consisting of radial webs and depressions. The gearwheel which is placed onto the coupling disk requires an axial mounting and is preferably provided with an annular, axially mounted collar surface. According to a preferred embodiment of the invention, the drive head has a mounting plate on which an electric motor is fixed and the drive shaft is mounted, and on which adjusting elements are also arranged, said adjusting elements bearing against the annular collar surface of the gearwheel and holding the gearwheel on the coupling disk with a press-on force which is matched to the torque to be transmitted by the overload coupling. The adjusting elements are expediently designed as spring elements.

A fork arm can be integrally formed on the ram head as a means of securing against rotation, said fork arm interacting with an element of the drive head that is fixed on the housing.

It furthermore lies within the scope of the invention for the drive head to be equipped with a measuring device for detecting the piston strokes executed by the ram. A stud is preferably integrally formed on the ram head and interacts with the measuring device and triggers a counting pulse on each stroke movement.

BRIEF DESCRIPTION OF THE DRAWINGS

Further refinements of the device according to the invention are described in patent claims 9 to 19 and will be explained below with reference to exemplary embodiments. In the drawings, schematically.

DETAILED DESCRIPTION OF PREFERRED EMBODIMENTS

Figure 1:
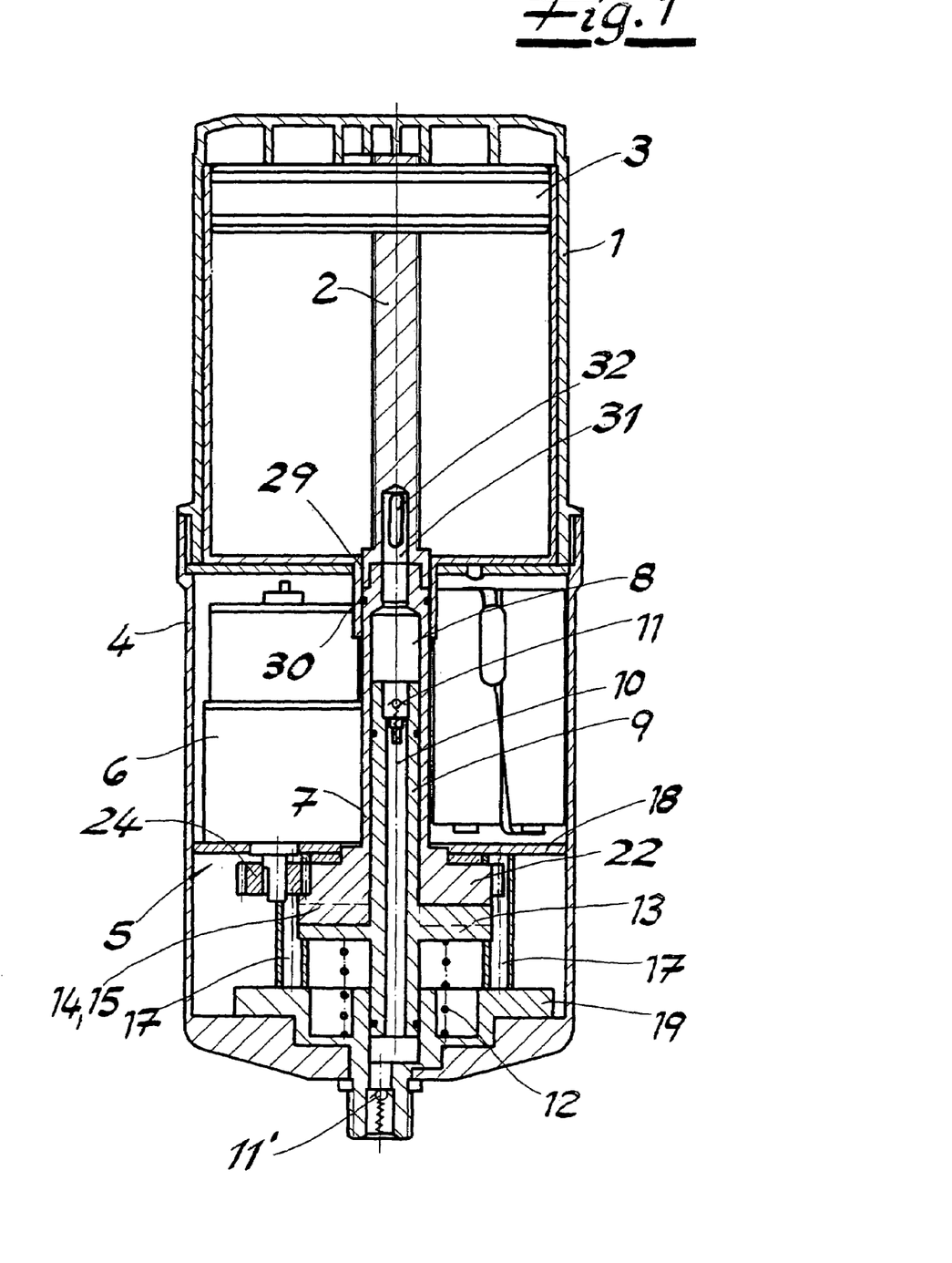
FIG. 1 shows a longitudinal section through a metering device according to the invention.

The metering device illustrated in FIG. 1 for lubricant has a lubricant reservoir 1 with a piston 3, which is arranged on a threaded spindle 2, and a drive head 4 having an electromechanical drive 5. The threaded spindle 2 is connected releasably to a drive shaft 7 of the drive head 4, the drive shaft being driven by an electric motor 6.

The drive shaft 7 contains a lubricant passage duct 8 which opens into the lubricant storage space of the lubricant reservoir 1. A ram 9 is inserted into the lubricant passage duct 8, said ram having an axial bore 10 with a nonreturn valve 11 on the inlet side, and a ram head 13 which is rotationally fixed in the drive head 4 and is supported in an axially movable manner on a compression spring 12. The ram head 13 bears under the effect of the compression spring 12 against a control surface 14 of the drive shaft 7. The control surface 14 and the associated contact surface 15 of the ram head 13 are designed as slotted-guide surfaces which, when the control surface 14 rotates, bring about strokes of the ram which convey the lubricant through the bore in the ram 9 to a lubricant outlet at the end of the ram. The design of the slotted-guide surfaces is clear from a comparison with FIG. 2. The slotted-guide surfaces on the control surface 14 and the associated contact surface 15 of the ram head 13 are of complementary design and have wedge-shaped sliding surfaces and steps adjoining them.

Figure 2:
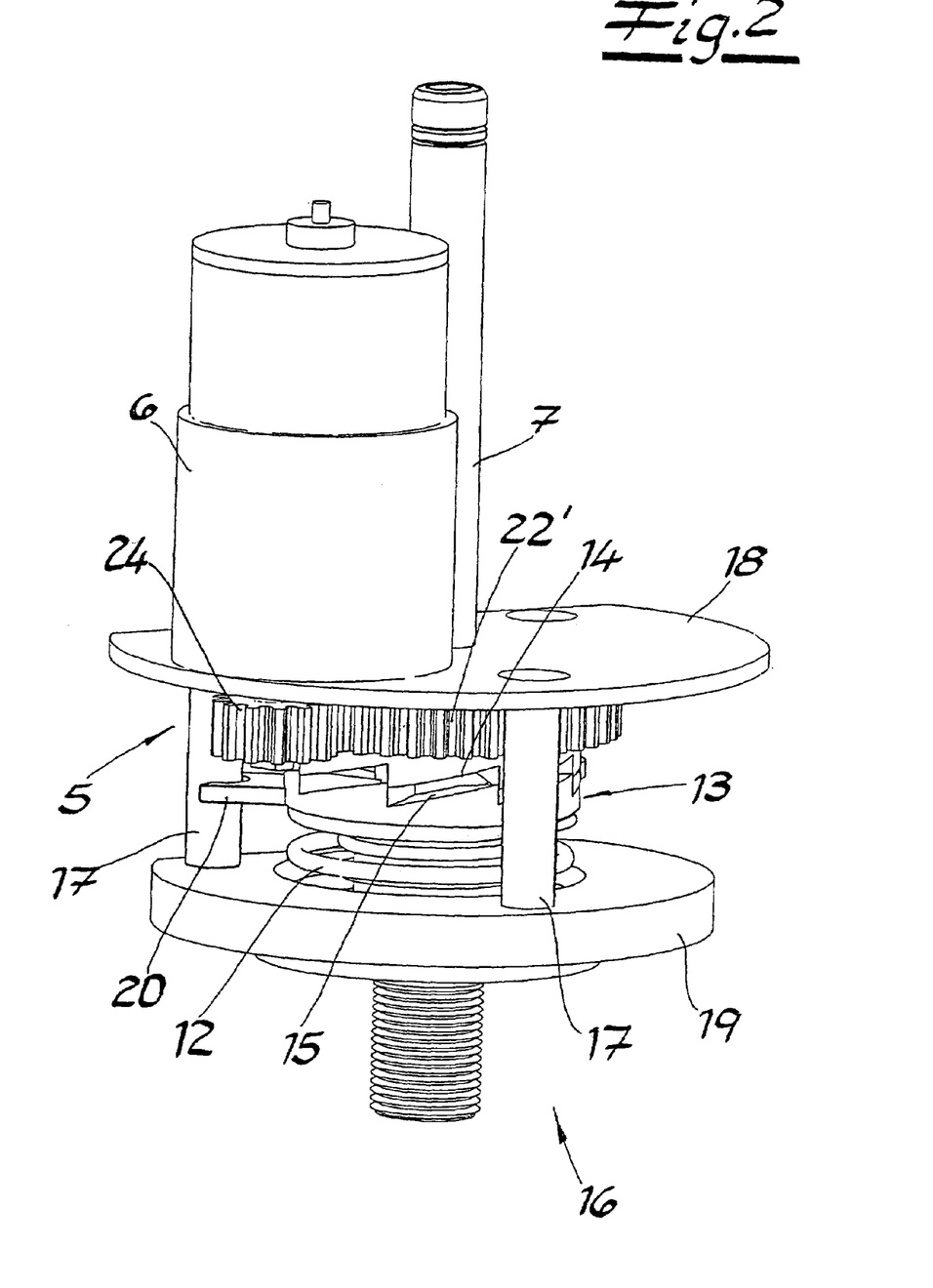
FIG. 2 shows the drive head of the metering device illustrated in FIG. 1, in a perspective illustration which is enlarged in comparison with FIG. 1.

The electric motor 6, the drive shaft 7, the ram 9 and the compression spring 12 are combined to form a drive assembly 16, which is illustrated in FIG. 2. The drive assembly 16 has a support structure comprising two mounting plates 18, 19 which are connected to each other by bolts 17. The electric motor 6 is flange-mounted on a mounting plate 18 and the drive shaft 7 is mounted. The other mounting plate 19 has a lubricant outlet duct interacting with the ram 9, and forms a supporting surface for the compression spring 12. A fork arm 20 is integrally formed on the ram head 13 as a means of securing against rotation, said fork arm being guided in an axially movable manner on a bolt 17.

As regards the further structural design, FIGS. 1 and 2 reveal that a gearwheel 22' which is supported axially in the drive head 4 is connected to or integrally formed on the end of the drive shaft 7, the gearwheel being in engagement with a pinion 24 of the electric motor 6 and having the control surface 14 for the movements of the ram. The lubricant-inlet end of the drive shaft 7 is guided in a cylindrical extension 29 of the lubricant reservoir and is sealed with respect to the extension 29 by means of an elastomer seal 30. The threaded spindle 2 has a head bore 31 at its connection end and at least one radial lubricant inlet opening 32 opening into the blind bore 31.

Figure 3:
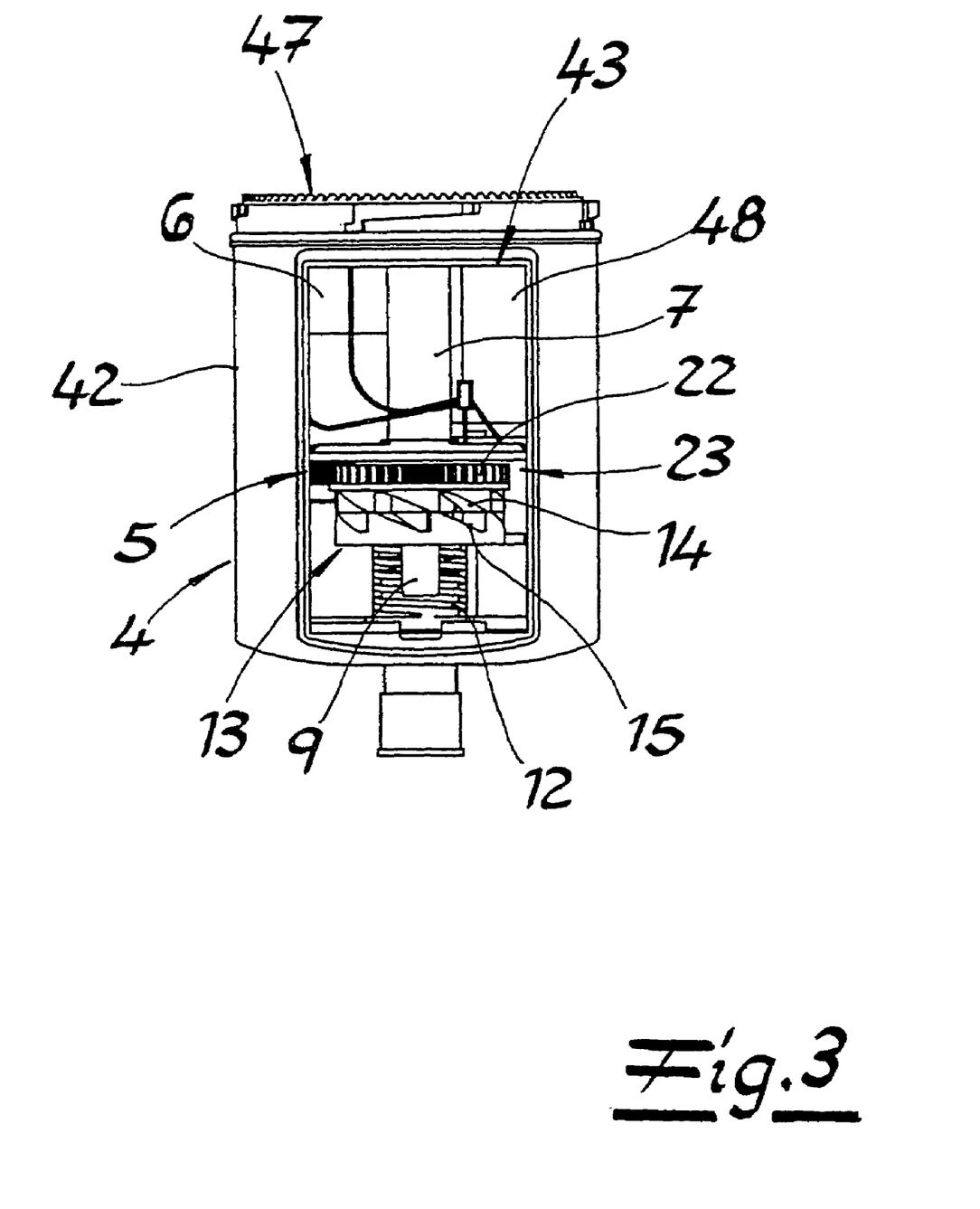
FIG. 3 shows a further refinement of the drive head in the fitted state.

In the embodiment illustrated in FIG. 3, the drive head 4 has a housing 42 which is preferably designed as a metal diecasting and has bearing surfaces for the attachment of a mounting plate 18, an integrally formed rib for axial guidance of the ram head 13 and a lubricant outlet duct which interacts with the ram 9. The fork arm 20 which is integrally formed on the ram head 13 is guided in an axially movable manner on the rib of the housing. The electromechanical drive 5 is arranged on the mounting plate 18 while the compression spring 12 is supported on the housing 42.

Figure 4:
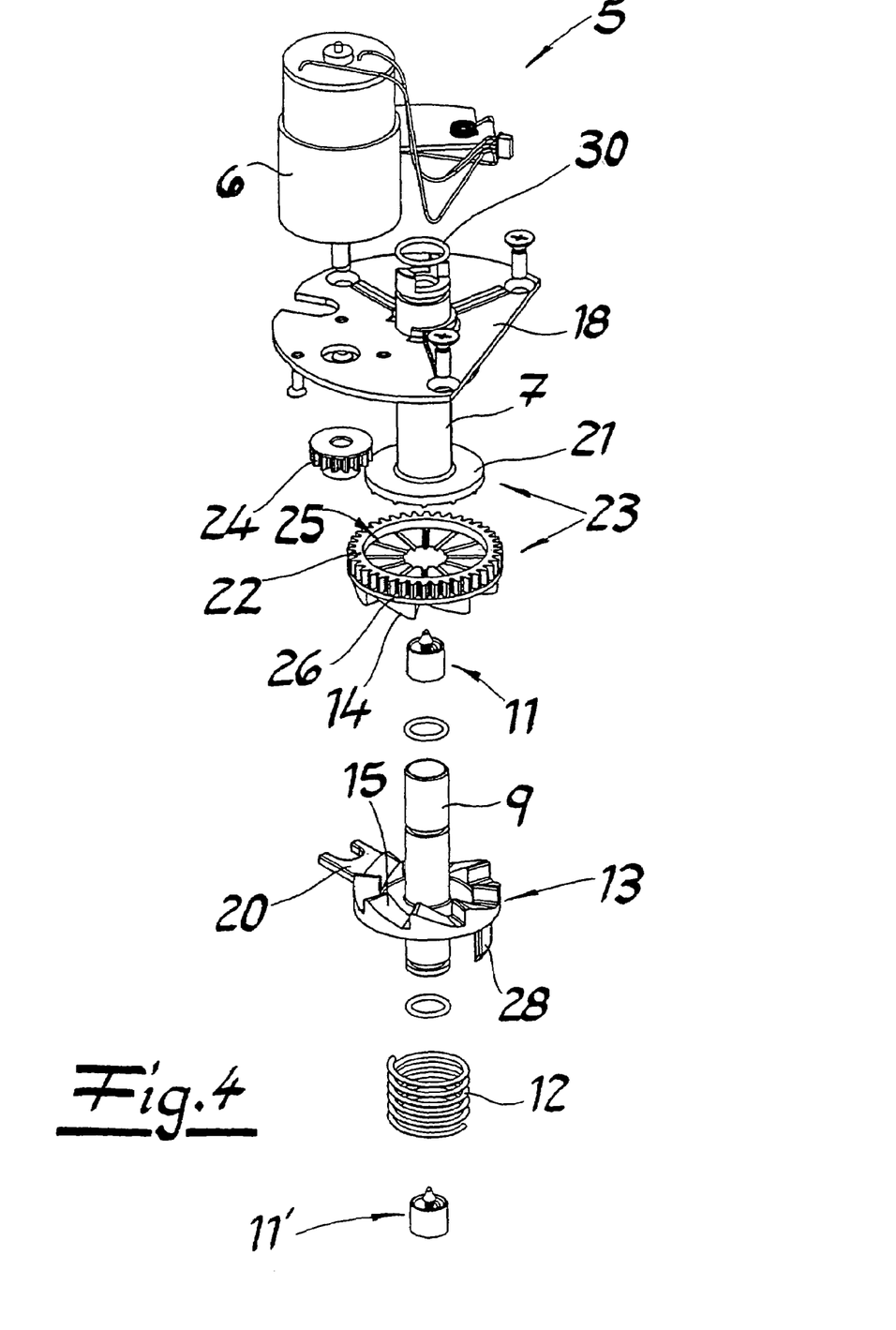
FIG. 4 shows an exploded illustration of the drive head.
Figure 5:
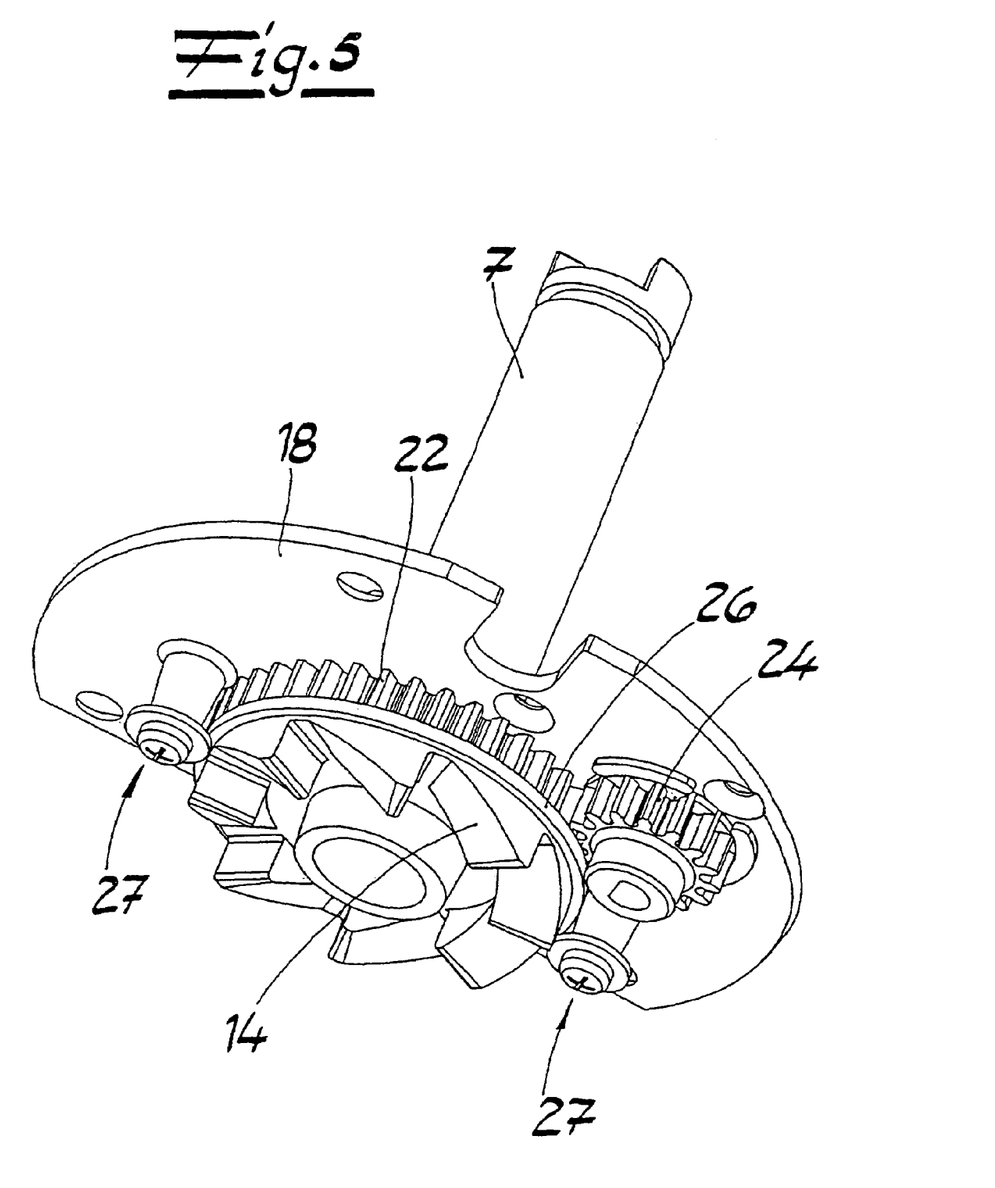
FIG. 5 shows a detail of the device illustrated in FIGS. 3 and 4, in the fitted state.
Figure 6:
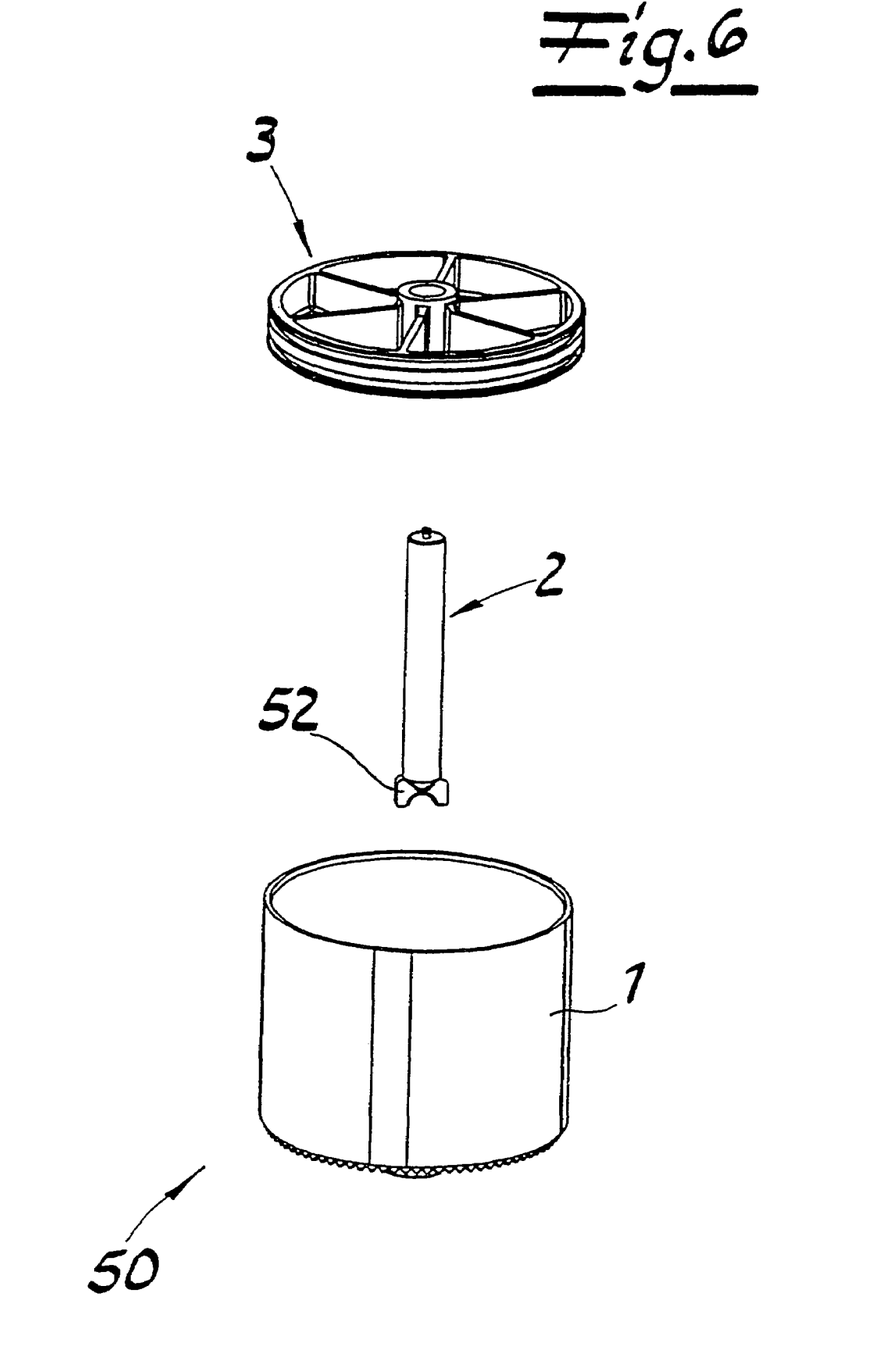
FIG. 6 shows a lubricant cartridge for use with the drive head illustrated in FIGS. 3 to 5.
Figure 7:
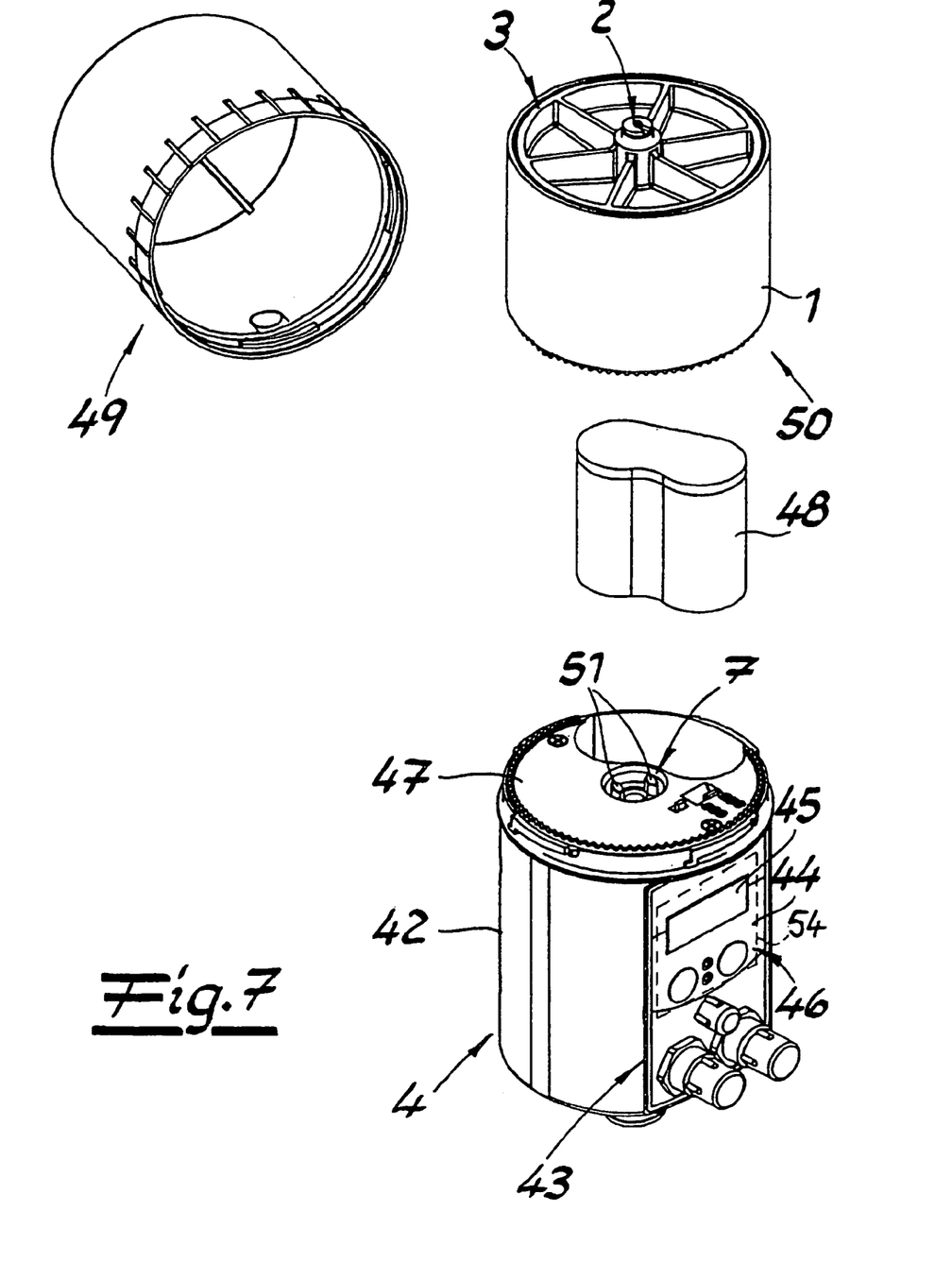
FIG. 7 shows a metering device comprising the subassemblies illustrated in FIGS. 3 to 6.

The exploded illustration of FIG. 4 reveals that a coupling disk 21 is integrally formed on the drive shaft 7. Furthermore, a gearwheel 22 which bears against an end side of the coupling disk 21 and forms an overload coupling 23 with the latter is provided. The gearwheel 22 is driven by a pinion 24 of the electromechanical drive 5 and bears the already described control surface 14 on the other end side. The gear ring of the gearwheel 22 surrounds a receiving space for the coupling disk 21 which is integrally formed on the drive shaft 7. The gearwheel 22 is placed onto the coupling disk 21 and guided rotatably on the circumference of the coupling disk 21. The base of the receiving space has a coupling profile 25 of bumps and depressions, which is in engagement with mating surfaces on the coupling disk 21. It is furthermore clear from the illustration of FIG. 5 that the gearwheel 22 has an annular collar surface 26 for the axial mounting, and that adjusting elements 27 are arranged on the mounting plate 18, on which the electric motor 6 is fixed and the drive shaft 7 is mounted, said adjusting elements bearing against the annular collar surface 26 of the gearwheel 22 and holding the gearwheel 22 on the coupling disk 21 with a press-on force which is matched to the torque to be transmitted by the overload coupling 23. The adjusting elements 27 are expediently designed as spring elements.

It is gathered from FIG. 4 that a stud 28 is integrally formed on the ram head 13. Said stud interacts with a measuring device 53 (illustrated in FIGS. 9*a* and 9*b*) for detecting the strokes of the piston executed by the ram 9 and triggers a counting pulse on each stroke movement of the ram head 13.

As regards the further structural refinement of the drive head 4, FIGS. 3 to 7 reveal that the housing 42, which is preferably designed as a metal diecasting, has a window 43 on the casing, into which a front plate 44 having a display 45 and a control panel 46 is inserted. A printed board 54 having an electronic controller for the electromechanical drive is arranged on the rear side of the front plate 44. A cover 47 is arranged on the housing 42 of the drive head 4, said cover covering the installation space of the electromechanical drive toward the lubricant reservoir and having openings for a coupling between the drive shaft 7 and the threaded spindle 2 and for the insertion of batteries 48. A cap 49 is detachably fastened on the drive head and forms a receiving space for an exchangeable lubricant cartridge 50. The lubricant cartridge 50 comprises the lubricant reservoir 1, the threaded spindle 2 and the piston 3.

In the embodiment illustrated in FIGS. 3 to 7, the lubricant-inlet end of the drive shaft 7 has projections 51 which form a coupling with a connection end of the threaded spindle 2. The connection end of the threaded spindle 2 is designed as a flat paddle 52 which permits an inflow of lubricant to the opening on the end side of the drive shaft 7. The paddle-shaped formation of the driver brings about movement in the lubricant and improves the flow of lubricant.

Furthermore, the design is distinguished by a large inflow cross section and in this respect constitutes a particularly preferred refinement. In all embodiments, the lubricant-inlet end of the drive shaft 7 is expediently guided in a cylindrical extension 29 of the lubricant reservoir and is sealed with respect to the extension 29 by means of an elastomer guide 30.

Figure 8:
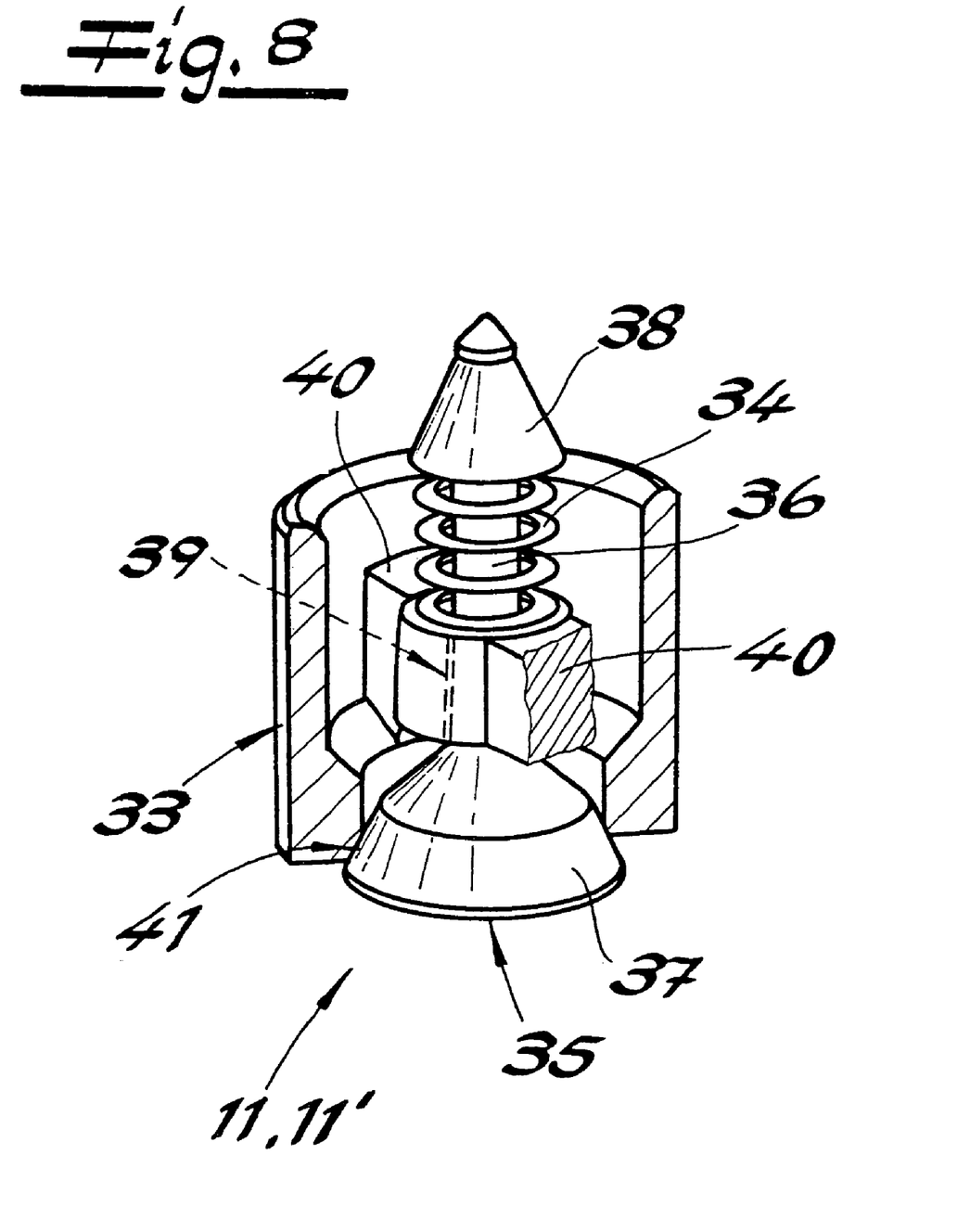
FIG. 8 shows a section through a nonreturn valve, which is installed in the device, in a greatly enlarged illustration.

A nonreturn valve 11 is inserted into the axial bore in the ram 9. In the exemplary embodiment, a further nonreturn valve 11' is provided in the lubricant outlet duct. The construction of the nonreturn valves 11, 11' which are preferably used is clear from FIG. 8. The nonreturn valve 11, 11' has a valve housing 33 which is fitted into the lubricant duct, and a valve body 35 which is acted upon by a compression spring 34. The valve body 35 comprises a ram 36, a conical closure element 37 on the end side and a ram head 38 which tapers to a point. A ram guide 39 is arranged in the flow space of the valve housing 33 and is connected by a transverse web 40 to the inner wall of the valve housing 33. The compression spring 34 is arranged between the ram guide 39 and the ram head 38 and pulls the closure element 37 against a valve seat 41 which is integrally formed on the outer side of the valve housing 33 in the flow outlet of the valve housing 33. The nonreturn valve 11, 11' has, in comparison with the diameter of the valve housing, a large annular space through which the medium flows. The ram head 38, which tapers to a point, ensures, in conjunction with the design of the valve housing 33, even with very viscous media, a rapid closing movement of the valve body necessary for correct operation of the metering device.

Figure 9A:
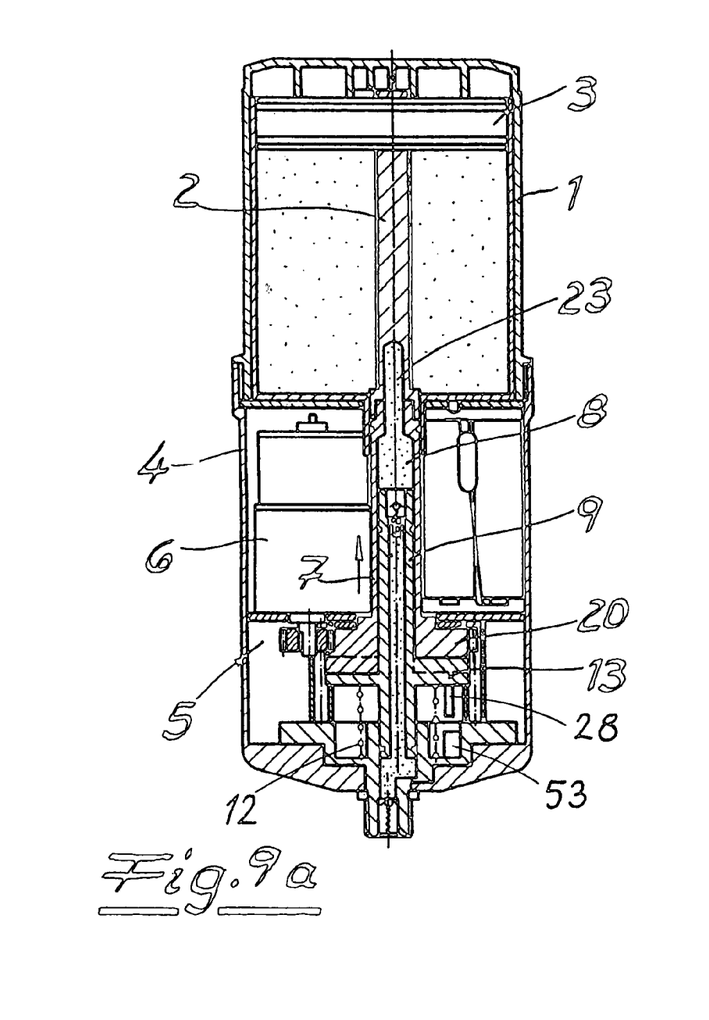
FIGS. 9a and 9b show different functional positions of the metering device during operation.
Figure 9B:
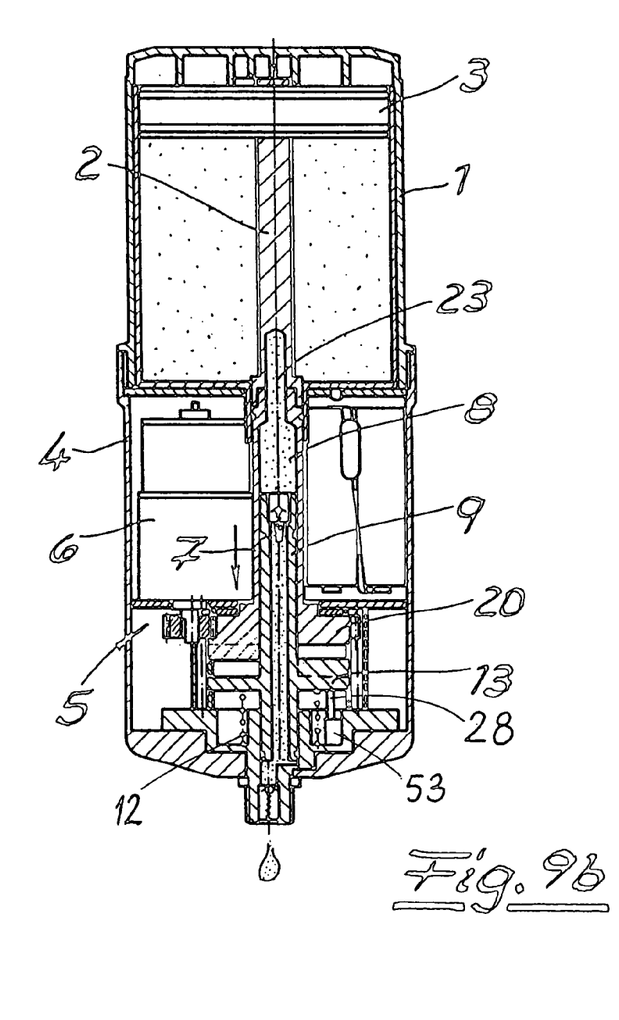

The functioning of the metering device is clear from comparing FIGS. 9*a* and 9*b*. When the drive shaft 7 and the threaded spindle 2 connected to it rotate, the piston 3, which is arranged in the lubricant reservoir 1, executes an adjusting movement in accordance with the thread pitch of the threaded spindle 2. In the process, the lubricant is displaced out of the lubricant reservoir 1 and supplied to the lubricant passage duct 8 of the drive shaft 7. At the same time, when the drive shaft 7 rotates, the ram 9 executes stroke movements which are controlled by the slotted-guide surfaces 14, 15. In the case of an inwardly directed stroke movement (illustrated in FIG. 9*a*), the nonreturn valve 11 opens and lubricant passes into the bore in the ram 9. During the following, outwardly directed stroke movement (illustrated in FIG. 9*b*), the nonreturn valve 11 closes and a defined quantity of lubricating product is ejected by the outwardly directed stroke of the ram. The quantity to be dispensed can be reproduced even with highly viscous lubricants and/or at very low operating temperatures, since the kinematically coupled movement of the piston 3 means that the lubricant passage duct 8 of the drive shaft 7 is always inevitably filled and the movement of the ram makes it possible for lubricant to be discharged at high ejection pressure. The device according to the invention is distinguished by a very simple mechanical construction. It is furthermore advantageous that lubricant reservoirs 1 which differ in size can be connected without making changes to the drive head 4.

The invention claimed is:

1. A metering device for lubricant having a lubricant reservoir (1), a piston (3), which is arranged on a threaded spindle (2), within the lubricant reservoir (1) and a drive head (4), which has a drive shaft (7) connected to the threaded spindle (2) and an electromechanical drive (5) for actuating the drive shaft (7), wherein the drive shaft (7) contains a lubricant passage duct (8) which opens into a lubricant storage space of the lubricant reservoir (1), wherein a ram (9) is inserted into the lubricant passage duct (8) of the drive shaft (7), said ram having an axial bore (10) with a nonreturn valve (11) on the inlet side, and a ram head (13) which is arranged in a rotationally fixed manner and is loaded by a compression spring (12), and wherein the ram head (13) bears under the effect of the compression spring (12) against a control surface (14) of the drive shaft (7), the control surface (14) and an associated contact surface (15) of the ram head (13) being designed as slotted-guide surfaces which, when the control surface (14) rotates, bring about stroke movements of the ram (9), said movements conveying the lubricant through the bore (10) in the ram (9) to a lubricant outlet at the end of the ram.

2. The metering device as claimed in claim 1,
wherein a gearwheel (22') is connected to or integrally formed on the end of the drive shaft (7), the gearwheel being supported in the drive head (4) and being in engagement with a pinion (24) of an electric motor (6) and having the control surface (14) for the movements of the ram.

3. The metering device as claimed in claim 1,
wherein the drive shaft (7) is provided at its end with a permanently connected coupling disk (21), and
wherein the electromechanical drive (5) comprises a gearwheel (22) which is driven by a pinion, bears against the coupling disk (21) and forms an overload coupling (23) with the coupling disk, the gearwheel (22) also having the control surface (14) which interacts with the ram head (13).

4. The metering device as claimed in claim 3,
wherein the gearwheel (22) has a gear ring which annularly surrounds a receiving space for the coupling disk (21) integrally formed on the ram (9),
wherein the gearwheel (22) is placed onto the coupling disk (21) and is guided rotatably on the circumference of the coupling disk (21), and
wherein a base of the receiving space has a coupling profile (25) of bumps or depressions, which is in engagement with mating surfaces on the coupling disk (21).

5. The metering device as claimed in claim 3,
wherein the drive head (4) has a mounting plate (18) on which an electric motor (10) is fixed and the drive shaft (7) is mounted, wherein the gearwheel (22) has an annular collar surface (26) for the axial mounting, and
wherein adjusting elements (27) are arranged on the mounting plate (18), bear against the annular collar surface (26) of the gearwheel (22) and hold the gearwheel (22) on the coupling disk (21) with a press-on force which is matched to the torque to be transmitted by the overload coupling (23).

6. The metering device as claimed in claim 1,
wherein a fork arm (20) is integrally formed on the ram head (13) as a means of securing against rotation, said fork arm interacting with an element of the drive head (4) that is fixed on a housing.

7. The metering device as claimed in claim 1,
wherein the drive head (4) has a measuring device 53 for detecting the piston strokes executed by the ram (9).

8. The metering device as claimed in claim 7,
wherein a stud (28) is integrally formed on the ram head (13), interacts with the measuring device (53) and triggers a counting pulse on each stroke movement.

9. The metering device as claimed in claim 1,
wherein a lubricant-inlet end of the drive shaft (7) is guided in a cylindrical extension (29) of the lubricant reservoir (1) and is sealed with respect to the extension (29) by means of an elastomer seal (30).

10. The metering device as claimed in claim 1,
wherein the drive shaft (7) is connected to the threaded spindle (2) by a plug-in coupling.

11. The metering device as claimed in claim 1,
wherein the threaded spindle (2) has a blind bore (31) at its connection end and at least one radial lubricant inlet opening (32) opening into the blind bore (31).

12. The metering device as claimed in claim 1,
wherein a lubricant-inlet end of the drive shaft (7) has projections (51) which form a coupling with a connection end of the threaded spindle (2), and in that the connection end of the threaded spindle (2) is designed as a flat paddle (52) which permits an inflow of lubricant to an opening on an end side of the drive shaft (7).

13. The metering device as claimed in claim 1,
wherein the drive head (4) has two mounting plates (18, 19) connected by bolts (17), as a support structure, with the electromechanical drive (5) being arranged on one mounting plate (18) and with the other mounting plate (19) having a lubricant outlet duct which interacts with the ram (9), and also forming a supporting surface for the compression spring (12), and the ram head (13) being guided in an axially movable manner on a bolt (17).

14. The metering device as claimed in claim 1,
wherein the drive head (4) has a housing (42) which has bearing surfaces for the attachment of a mounting plate (18), an integrally formed rib for axial guidance of the ram head (13) and a lubricant outlet duct which interacts with the ram (9), the electromechanical drive (5) being arranged on the mounting plate (18) and the compression spring (12) being supported on the housing (42).

15. The metering device as claimed in claim 14,
wherein the housing (42) has a window (43) on a casing, into which a front plate (44) having a display and control panel (45, 46) is inserted, with a printed board 54 having an electronic controller for the electromechanical drive (5) being arranged on the rear side of the front plate (44).

16. The metering device as claimed in claim 14,
wherein a cover (47) is arranged on the housing (42), said cover covering the installation space of the electromechanical drive toward the lubricant reservoir and having openings for a coupling between the drive shaft (7) and the threaded spindle (2) and for the insertion of batteries (48).

17. The metering device as claimed in claim 1,
wherein a cap (49) is fastened releasably on the drive head (4) and forms a receiving space for an exchangeable lubricant cartridge (50).

18. The metering device as claimed in claim 1,
wherein the nonreturn valve (11) has a valve housing (33) which is fitted into the axial bore (10) in the ram (9) and has a valve body (35) which is acted upon by a compression spring (34), the valve body (35) comprising a ram (36), a conical closure element (37) on the end side and a ram head (38) tapering to a point, a ram guide (39) being arranged in the flow space of the valve housing (33) and being connected by a transverse web (40) to the inner wall of the valve housing (33), and the compression spring (34) being arranged between the ram guide (39) and the ram head (38) and pulling a closure element (37) against a valve seat (41) which is integrally formed on the outer side of the valve housing (33) in a flow outlet (33) of the valve housing.

19. The metering device as claimed in claim 1,
wherein a second nonreturn valve (11') is arranged in a lubricant outlet duct.

* * * * *